United States Patent
Joseph et al.

(10) Patent No.: US 11,755,613 B2
(45) Date of Patent: *Sep. 12, 2023

(54) STREAMLINED DATA ENGINEERING

(71) Applicant: Bank of America Corporation, Charlotte, NC (US)

(72) Inventors: Thomas Joseph, Old Bridge, NJ (US); John Abraham, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,472

(22) Filed: Aug. 29, 2022

(65) Prior Publication Data

US 2022/0414118 A1 Dec. 29, 2022

Related U.S. Application Data

(63) Continuation of application No. 17/353,878, filed on Jun. 22, 2021, now Pat. No. 11,475,036.

(51) Int. Cl.
*G06F 16/25* (2019.01)
*G06F 16/22* (2019.01)
(Continued)

(52) U.S. Cl.
CPC .......... *G06F 16/258* (2019.01); *G06F 16/113* (2019.01); *G06F 16/211* (2019.01);
(Continued)

(58) Field of Classification Search
None
See application file for complete search history.

(56) References Cited

U.S. PATENT DOCUMENTS 7,849,108 B1 12/2010 Kapor
2018/0373781 A1* 12/2018 Palrecha .................. G06N 3/08
(Continued)

OTHER PUBLICATIONS

Roy Hegdish, "What Is Apache Parquet and Why Should You Use It," https://www.upsolver.com/blog/apache-parquet-why-use, Upsolver, May 6, 2020.

(Continued)

*Primary Examiner* — Alex Gofman
*Assistant Examiner* — Umar Mian
(74) *Attorney, Agent, or Firm* — Weiss & Arons LLP

(57) ABSTRACT

A method for standardizing data input, data output and data manipulation at a data lake is provided. Methods include receiving a data transfer instruction comprising a seed file. Methods include parsing the seed file. Methods include validating the seed file. Methods include retrieving one or more data elements from one or more data sources as specified in the seed file. Methods include saving the retrieved data elements to a data lake. Methods include archiving the data elements at the data lake. Methods include receiving a schema from a network data mover client at an edge node at the data lake. Methods include creating a table to match the schema and validating the data elements using the schema. Methods include pushing the data elements into the table using the schema. Methods include saving the table that comprises the data elements in a shoreline edge node within the data lake.

7 Claims, 16 Drawing Sheets

(51) Int. Cl.
  *G06F 16/21*    (2019.01)
  *G06F 16/11*    (2019.01)
  *G06F 40/205*   (2020.01)
  *G06F 16/215*   (2019.01)

(52) U.S. Cl.
  CPC ........ *G06F 16/215* (2019.01); *G06F 16/2282* (2019.01); *G06F 40/205* (2020.01)

(56) References Cited

U.S. PATENT DOCUMENTS

| | | |
|---|---|---|
| 2019/0370263 A1 | 12/2019 | Nucci et al. |
| 2020/0125530 A1* | 4/2020 | Barth .................. G06F 16/13 |
| 2020/0174966 A1 | 6/2020 | Szczepanik et al. |
| 2020/0193057 A1 | 6/2020 | Yu et al. |
| 2021/0232604 A1 | 7/2021 | Sundaram et al. |
| 2022/0012250 A1* | 1/2022 | Colcord .............. G06F 21/6254 |

OTHER PUBLICATIONS

Craig Stedman et al., "What Is Data Governance and Why Does It Matter," What Is Data Governance and Why Does It Matter? (techtarget.com), TechTarget, Feb. 14, 2020.

Tom White, "Hadoop: The Definitive Guide Third Edition," www.wowebook.com, O'Reilly, Retrieved on Jun. 4, 2021.

Haines, Richard, "How to Seed a Postgres Database with Node," Published Feb. 9, 2021 by DEV Community, Accessed Jul. 7, 2022 from https://dev.to/studio_hungry/bow-to-seed-a-postgres-database-with-node-384i (Year: 2021).

* cited by examiner

| Bronze (350) | Silver (352) | Gold (354) | Green (356) |
|---|---|---|---|
| - Data from SOR<br>- Data converted from native format to accessible format<br>- Validated during ingestion<br>- For discovery, analytics and for deriving common application specific data | - Common business logic for consistent analysis<br>- Integrated, conformed data<br>- Transformed, organized for common use<br>- Provides business logic for common use<br>- For provisioning, analytics | - More refined, organized for application-specific use for analytics modeling, reporting<br>- Integrated, aggregated, summarized application specific logic | - Transient workspaces<br>- User-managed data (temporary workspaces)<br>- Interim space to support analytical workflows and report/model developement<br>- Access limited to individuals, workgroups |

FIG. 3B

Mtcjob1.seed ⟵ 802

124|sftp||remote host to be fetched from <user>_properties file||ASAP/MTC/STM923TA.TRADEDTL|sftp.util.user.${env}|Password from env|||||||||||mtctrade 124|sftp||remote host to be fetched from <user>_properties file||ASAP/MTC/STM925TA.PACKGDTL|sftp.util.user.${env}|Password from env|||||||||||mtcpkg

Mtcpackage.schema — 902

```
{
"type": "record",
"name": "MTCPACKGRecords",
"doc": "MTC TRADE PACKGRecords",
"fields":
[
    {"name": "PROCESS_DATE", "type": "string", "doc": "partition"},
    {"name": "PKG_ACCT_NO", "type": "string"},
    {"name": "PKG_STENCIL_NUM", "type": "string"},
    {"name": "PKG_REFERENCE_NO", "type": "string"},
    {"name": "PKG_ORI_ML_LGEY_CD", "type": "string"},
    {"name": "PKG_FC_NO", "type": "string"},
    {"name": "PKG_NET_AMOUNT", "type": "string"},
    {"name": "PKG_NUM", "type": "string"},
    {"name": "PKG_BRODCORT_IND", "type": "string"},
    {"name": "PKG_DESTINATION", "type": "string"},
    {"name": "PKG_MLOL_IND", "type": "string"},
    {"name": "PKG_MLR", "type": "string"},
    {"name": "PKG_TYPE", "type": "string"},
    {"name": "PKG_AMDIR_IND", "type": "string"},
    {"name": "PKG_MIXED_PROSP_IND", "type": "string"},
    {"name": "PKG_MIXED_SUPP_IND", "type": "string"},
    {"name": "PKG_FIRST_TRADE_IND", "type": "string"},
    {"name": "PKG_PROSP_TRADES_TYPE", "type": "string"},
    {"name": "PKG_SUPP_TRADES_TYPE", "type": "string"},
    {"name": "PKG_TRADE_DT", "type": "string"},
    {"name": "PKG_TRADE_STA_CD", "type": "string"}
```

Mtctrade.schema —1002

```
{
"namespace":"com.bank.ccs.spark.avro.mtc",
"type":"record",
"name":"VoMTCTrade",
"doc":"MTC TRADE Records",
"fields":
1004 [
    {"name":"PROCESS_DATE","type":"string", "doc":"partition"},
    {"name":"TRA_ACCT_NO","type":"string"},
    {"name":"TRA_STENCIL_NUM","type":"string"},
    {"name":"TRA_REFERENCE_NO","type":"string"},
    {"name":"TRA_FC_NO","type":"string"},
    {"name":"TRA_NET_AMOUNT","type":"string"},
    {"name":"TRA_SECURITY","type":"string"},
    {"name":"TRA_SYMBOL","type":"string"},
    {"name":"TRA_CUSIP","type":"string"},
    {"name":"TRA_PRICE","type":"string"},
    {"name":"TRA_QUANTITY","type":"string"},
    {"name":"TRA_SETTLEMENT_DATE","type":"string"},
    {"name":"TRA_TRADE_DATE","type":"string"},
    {"name":"TRA_BUY_SELL","type":"string"},
    {"name":"TRA_SEC_TYPE","type":"string"},
    {"name":"TRA_IPO_IND","type":"string"},
    {"name":"TRA_BLUESKY_IND","type":"string"},
    {"name":"TRA_CONFIDENTIAL_IND","type":"string"},
    {"name":"TRA_DUPE_IND","type":"string"},
    {"name":"TRA_PROSPECTUS_IND","type":"string"},
    {"name":"TRA_FOREIGN_IND","type":"string"},
    {"name":"TRA_RETAIL_IND","type":"string"},
```

FIG. 10A

Mtctrade.schema cont. — 1002

{"name":"TRA_MUNI_IND","type":"string"},
{"name":"TRA_SUPP_IND","type":"string"},
{"name":"TRA_MLPT_CD","type":"string"},
{"name":"TRA_ML_OPINION","type":"string"},
{"name":"TRA_DISPL_IND","type":"string"},
{"name":"TRA_BKRSYMBL","type":"string"},
{"name":"TRA_BRDCORT_IND","type":"string"},
{"name":"TRA_ACCT_TYP_CD","type":"string"},
{"name":"TRA_TLB_EX_LIS_CD","type":"string"},
{"name":"TRA_TLB_CAPC_CD","type":"string"},
{"name":"TRA_OFF_TYP_CD","type":"string"},
{"name":"TRA_OPTING_OUT","type":"string"},
{"name":"TRA_TOT_BOUGHT_AMOUNT","type":"string"},
{"name":"TRA_TOT_SOLD_AMOUNT","type":"string"},
{"name":"TRA_TOT_NET_AMOUNT","type":"string"},
{"name":"TRA_BCC_CF_TYPE_CD","type":"string"},
{"name":"TRA_PROP_IND","type":"string"},
{"name":"TRA_ACCESS_DELIVERY_IND","type":"string"},
{"name":"TRA_PRIM_ACCT_NO","type":"string"},
{"name":"TRA_HOUSE_HOLD_IND","type":"string"},
{"name":"TRA_TRADE_EXE_TM","type":"string"},
{"name":"TRA_TCF_EXE_TM_CD","type":"string"},
{"name":"TRA_TRADE_ORD_TY_CD","type":"string"},
{"name":"TRA_OLC_EMEA_IN","type":"string"},
{"name":"TRA_CNY_CD","type":"string"},
{"name":"TRA_PBIG_IND","type":"string"},
{"name":"TRA_NONUS_ENTITY_NAME_IND","type":"string"},
{"name":"TRA_GSI_IND","type":"string"},
{"name":"TRA_TRADE_STA_CD","type":"string"},

Mctrade.schema cont. — 1002

1008 —
{"name":"TRA_LOGO_CD","type":"string"},
{"name":"TRA_ML_LGEY_CD","type":"string"},
{"name":"TRA_RDR_IND","type":"string"},
{"name":"TRA_COMM_MARK_UP_DOWN","type":"string"},
{"name":"TRA_SEC_FEE","type":"string"},
{"name":"TRA_OE_CD","type":"string"},
{"name":"TRA_ORI_ML_LGEY_CD","type":"string"},
{"name":"TRA_INTEREST_DIVIDEND","type":"string"},
{"name":"TRA_PRINCIPAL","type":"string"},
{"name":"TRA_PROCESSING_FEE","type":"string"},
{"name":"TRA_REPO_TYPE","type":"string"},
{"name":"TRA_REPO_PURCH_DT","type":"string"},
{"name":"TRA_PRICE_RATE","type":"string"},
{"name":"TRA_REPURCH_PRICE","type":"string"},
{"name":"TRA_REPURCH_DT","type":"string"},
{"name":"TRA_REPO_SIDE_INDR","type":"string"},
{"name":"TRA_TR_ZREPO","type":"string"},
{"name":"TRA_CONF_TYPE","type":"string"},
{"name":"TRA_ID_NO","type":"string"},
{"name":"TRA_DUPE","type":"string"},
{"name":"TRA_MFA_CD_IND","type":"string"},
{"name":"TRA_REFERENCE_NO_EXT","type":"string"},
{"name":"TRA_API_ERR_MSG","type":"string"},
{"name":"TRA_ORIGINAL_RF_NO","type":"string"},
{"name":"TRA_BENEFICIAL_IND","type":"string"},
{"name":"TRA_MUSH_FEE","type":"string"},
{"name":"TRA_ZSECTYPE","type":"string"},
{"name":"TRA_PROCESS_DATE","type":"string"},

FIG. 10C

Mtctrade.schema cont. /— 1002

```
{"name":"TRA_ENTITY_CODE","type":"string"},
{"name":"TRA_AFFLUENCE_CD","type":"string"},
{"name":"TRA_TRADE_GNR_EXE_TM_CD","type":"string"},
{"name":"TRA_RCC_IF_ENTY","type":"string"},
{"name":"TRA_PROS_SPP_IND","type":"string"},
{"name":"TRA_EPROS_IND","type":"string"},
{"name":"TRA_PROS_SUPP_TRT","type":"string"},
{"name":"TRA_MDL_MSG_CD","type":"string"},
{"name":"TRA_PROD_LUP_DT","type":"string"},
{"name":"TRA_TRADE_GST_LIA_AM","type":"string"},
{"name":"TRA_TRADE_GST_AM","type":"string"},
{"name":"TRA_TRADE_GST_RT","type":"string"},
{"name":"TRA_GSTFX_RATE","type":"string"},
{"name":"TRA_NET_AMOUNT_SGD","type":"string"},
{"name":"TRA_TRADE_GST_LIA_AM_SGD","type":"string"},
{"name":"TRA_TRADE_GST_AM_SGD","type":"string"},
{"name":"TRA_NET_AMOUNT_NOGST_SGD","type":"string"},
{"name":"TRA_TRADE_GST_CD","type":"string"},
{"name":"TRA_NET_AMOUNT_NOGST","type":"string"},
{"name":"TRA_SC_DN_CO_CD","type":"string"},
{"name":"TRA_ORIG_SUPP_IND","type":"string"},
{"name":"TRA_NEWML_OPINION","type":"string"},
{"name":"TRA_TCF_DCLS_BRGN_CD","type":"string"},
{"name":"TRA_ENCL_CD","type":"string"},
{"name":"TRA_JB_IND","type":"string"},
{"name":"TRA_NEXTGEN_IND","type":"string"},
{"name":"TRA_OPT_B529_EDU_STATE","type":"string"},
```

FIG. 10D

Mtctrade.schema cont. — 1002

```
{"name":"TRA_TD_PRN_AGT_IND","type":"string"},
{"name":"TRA_TCF_OFC_PFX_BUS_TY_CD","type":"string"},
{"name":"TRA_TD1_TRL_SEL_CDE","type":"string"},
{"name":"TRA_TCF_SPP_RSN_CD","type":"string"},
{"name":"TRA_LVL_1_CODE","type":"string"},
{"name":"TRA_LVL_2_CODE","type":"string"},
{"name":"TRA_ENC_CODE","type":"string"},
{"name":"TRA_OPT_SUP_SFM","type":"string"},
{"name":"TRA_OPT_CONF_SUPP","type":"string"},
{"name":"TRA_OPT_PROSPECTUSES_SUPP_TRT","type":"string"},
{"name":"TRA_MANAGED_ACC_IND","type":"string"},
{"name":"TRA_NA_PROD_CD","type":"string"},
{"name":"TRA_OFFSHORE_IND","type":"string"},
{"name":"FUND_LGL_STRCT_NO","type":"string"},
{"name":"MNGD_ACCT_START_TYP","type":"string"},
{"name":"MNGD_DCR_IND","type":"string"},
{"name":"MNGD_OWNERSHIP_CD","type":"string"},
{"name":"KD_PAI_IND","type":"string"},
{"name":"TRA_BANKSE_IND","type":"string"},
{"name":"MTC_NO_ACTION_IND","type":"string"},
{"name":"MTC_PROSP_INCL_IND","type":"string"}
]}
```
1012

FIG. 10E

MtcTradeReconDashboardRecipe —1102

124|1@mtctrade/process_date_partition@mtctrade@*@#2@mtc_cob_date/*@mtccobdate@*@ @|1@Y@ @select a.TRA_ACCT_NO as ACCOUNT_NO ,case when a.TRA_BRDCORT_IND = '' then 'N' when a.TRA_BRDCORT_IND = 'N' then 'N' else 'Y' end as BRDCORT_IND,a.TRA_STENCIL_NUM as STENCIL_NO,a.TRA_FC_NO as FC_NO,a.PROCESS_DATE,a.TRA_REFERENCE_NO,a.TRA_NET_AMOUNT as NET_AMOUNT,a.TRA_SECURITY as SECURITY,a.TRA_CUSIP as CUSIP,a.TRA_PRICE as PRICE,a.TRA_SETTLEMENT_DATE AS SETTLEMENT_DATE,a.TRA_TRADE_DATE AS TRADE_DATE,a.TRA_BUY_SELL AS BUY_SELL,a.TRA_SEC_TYPE ,case when a.TRA_SEC_TYPE = '01' then 'EQUITIES, IPO, SYNDICATES' when a.TRA_SEC_TYPE = '02' then 'MUNICIPALS' when a.TRA_SEC_TYPE = '03' then 'GOVERNMENT' when a.TRA_SEC_TYPE = '04' then 'MUTUAL FUNDS' when a.TRA_SEC_TYPE = '05' then 'UNITS' when a.TRA_SEC_TYPE = '06' then 'INTERNATIONAL/GOLD' when a.TRA_SEC_TYPE = '' then 'FIXED INCOME' ELSE 'No Type' end as SECURITY_TYPE,case when a.TRA_MLPT_CD = '01' then 'Asset Backed' when a.TRA_MLPT_CD = '02' then 'Auction Market Pref' when a.TRA_MLPT_CD = '03' then 'Government Security' when TRA_MLPT_CD = '3C' then 'CD Callable' when TRA_MLPT_CD = '3G' then 'CD Generic' when TRA_MLPT_CD = '3J' then 'CD Jumbo' when TRA_MLPT_CD = '3I' then 'CD CPI' when TRA_MLPT_CD = '3S' then 'CD Structured' when a.TRA_MLPT_CD = '04' then 'Commercial Paper' when a.TRA_MLPT_CD = '05' then 'Corporate Bond' when a.TRA_MLPT_CD = '06' then 'Govt Agency Bond' when a.TRA_MLPT_CD = '07' then 'Equity' when a.TRA_MLPT_CD = '08' then 'Limited Partnership' when a.TRA_MLPT_CD = '09' then 'Govt Agency Bond' when a.TRA_MLPT_CD = '10' then 'Municipal Bonds' when a.TRA_MLPT_CD = '11' then 'Mutual Funds/Money Fund' when TRA_MLPT_CD = '12' then 'Gold' when TRA_MLPT_CD = '13' then 'International Securities' when TRA_MLPT_CD = '14' then 'ETF' when TRA_MLPT_CD = '15' then 'Closed End Fund' when TRA_MLPT_CD = '' then 'Fixed Income' ELSE 'No Type' end as MLPT_CD,a.TRA_MLPT_CD,a.TRA_BLUESKY_IND AS BLUESKY_INDICATOR,a.TRA_SUPP_IND as SUPPRESS_INDICATOR,a.TRA_ML_LGEY_CD as LegalEntity,a.TRA_QUANTITY as QUANTITY, a.TRA_COMM_MARK_UP_DOWN as COMM_MARK_UP_DOWN,a.TRA_OE_CD as OE_CD,a.TRA_PROSPECTUS_IND as PROSPECTUS_INDICATOR,COALESCE(NVL(a.TRA_SEC_FEE,''),'0') as SECURITY_FEE,a.TRA_ACCESS_DELIVERY_IND as ACCESS_DELIVERY_IND,a.TRA_HOUSE_HOLD_IND as HOUSE_HOLD_IND,a.TRA_DUPE_IND as DUPE_INDICATOR,a.TRA_CONFIDENTIAL_IND as CONFIDENTIAL_INDICATOR,a.TRA_LOGO_CD,case When a.TRA_LOGO_CD = '0' then '529' When a.TRA_LOGO_CD = 'G' then 'Institutional' When a.TRA_LOGO_CD = 'H' then 'Trust' When a.TRA_LOGO_CD = 'P' then 'Private Client' When a.TRA_LOGO_CD = 'W' then 'Standard' When a.TRA_LOGO_CD = 'X' then 'International' When a.TRA_LOGO_CD = 'Y' then 'Edge Self Direct' When a.TRA_LOGO_CD = 'Z' then 'Edge MEAC' When a.TRA_LOGO_CD = '' then 'BCC' else 'No LOGO' end as LOGO_CD,a.TRA_LVL_1_CODE as ProductLevel1, a.TRA_LVL_2_CODE as ProductLevel2,a.TRA_MANAGED_ACC_IND as MANAGED_ACC_IND,case when a.TRA_MANAGED_ACC_IND = '' then 'N' else 'Y' end as MANAGED_ACC_Grp,a.TRA_NA_PROD_CD,a.TRA_OFFSHORE_IND,a.FUND_LGL_STRCT_NO,a.MNGD_ACCT_START_TYP,a.MNGD_DC R_IND,a.MNGD_OWNERSHIP_CD,a.KD_PAI_IND,a.TRA_BANKSE_IND,a.MTC_NO_ACTION_IND,a.MTC_PROSP_INCL_IND from mtctrade a where date_format(a.PROCESS_DATE,'MM-DD-YYYY') IN (select date_format(b.cob_date, MM-DD-YYYY') from mtccobdate b)@MTC_DASHBOARD@Y@MTC_DASHBOARD@N@PROCESS_DATE|sarab
⸺1104

FIG. 11

STREAMLINED DATA ENGINEERING

CROSS-REFERENCE TO RELATED APPLICATION

This application is a continuation of U.S. patent application Ser. No. 17/353,878 filed on Jun. 22, 2021, now U.S. Pat. No. 11,475,036 and entitled "STREAMLINED DATA ENGINEERING" which is hereby incorporated by reference herein in its entirety.

FIELD OF TECHNOLOGY

Aspects of the disclosure relate to data lake architectures.

BACKGROUND OF THE DISCLOSURE

Conventionally, a data lake requires customized data management for an entity inputting the data into the data lake, an entity storing the data at the data lake and an entity retrieving the data from the data lake.

It would be desirable for a system that works together with a data lake. Such a system would preferably remove the data management onus from the entity inputting the data, the entity storing the data and the entity retrieving the data. As such, the entity inputting the data, the entity storing the data and the entity retrieving the data may be unaware of the data structure and data storage structures within the data lake. Such a system would preferably streamline data input, data output, data storage and data manipulation at the data lake.

SUMMARY OF THE DISCLOSURE

Apparatus and methods for a system for standardizing the data input, data output, data storage and data manipulation at a data lake is provided. The system may include a data transporter, a data ingester and a data chef.

A data transporter may be operable to receive a seed file. A seed file may include a list of data elements and data source location information for each data element. The data transporter may parse the seed file into a plurality of data elements and data source locations.

The data transporter may validate the seed file by validating that each data element is located in the data source location included in the plurality of data sources. Upon validation, the data transporter may retrieve the data elements from the plurality of data source locations. The data transporter may transfer the retrieved data elements from the data locations to an edge node at the data lake.

A data ingester may be operable to receive a schema configuration file for each of the data elements. The schema configuration file may include field definitions, validation rules and mappings for data elements. Field definitions may include information that delineates a single field in a file. A field may correspond to a data element. Validation rules may specify a predetermined format to which the files should conform and which type of data should be included at which locations within the predetermined structure or format. Mappings may enable a system to arrange data stored in files so that the information can be imported into a predefined table in an application.

The data ingester may label the data elements located at the edge node at the data lake, based on the schema configuration file. The data ingester may convert the data elements located at the edge node at the data lake to a data lake accessible format. The data ingester may execute standardized validation rules on the data elements located at the edge node at the data lake. The data ingester may store the labeled, converted and validated data elements in one or more locations at the data lake based on the schema configuration file. The data ingester may archive the labeled, converted and validated data elements at the data lake.

A data chef may be operable to execute a second schema configuration file on the data elements stored in the one or more locations at the data lake. The second schema configuration file may be operable to instruct a transformation of the data elements, stored in the one or more locations at the data lake, into data elements that are integrated and conform with the second schema configuration file. The data manipulated via the second schema configuration file may be a first level of curated data. The first level of curated data may be referred to herein, in the alternative, as silver data.

The second schema configuration file may be received from a source other than the data source. Examples of the source of the second schema configuration file may include data consumers and end users.

The data chef may also execute one or more recipes of the stored data elements. The one or more recipes may manipulate the data elements into data elements that are specifically consumable by one or more end users. The one or more recipes may be received from one or more end users. The data manipulated via the one or more recipes is a second level of curated data. The second level of curated data may be referred to herein, in the alternative, as gold data.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 3A and 3B show illustrative diagrams in accordance with principles of the disclosure;

FIG. 8 shows an illustrative computer code segment in accordance with principles of the disclosure;

FIG. 9 shows another illustrative computer code segment in accordance with principles of the disclosure;

FIGS. 10A, 10B, 10C, 10D and 10E show yet another illustrative computer code segment in accordance with principles of the disclosure; and FIG. 11 shows still another illustrative computer code segment in accordance with principles of the disclosure.

DETAILED DESCRIPTION OF THE DISCLOSURE

Figure 1:
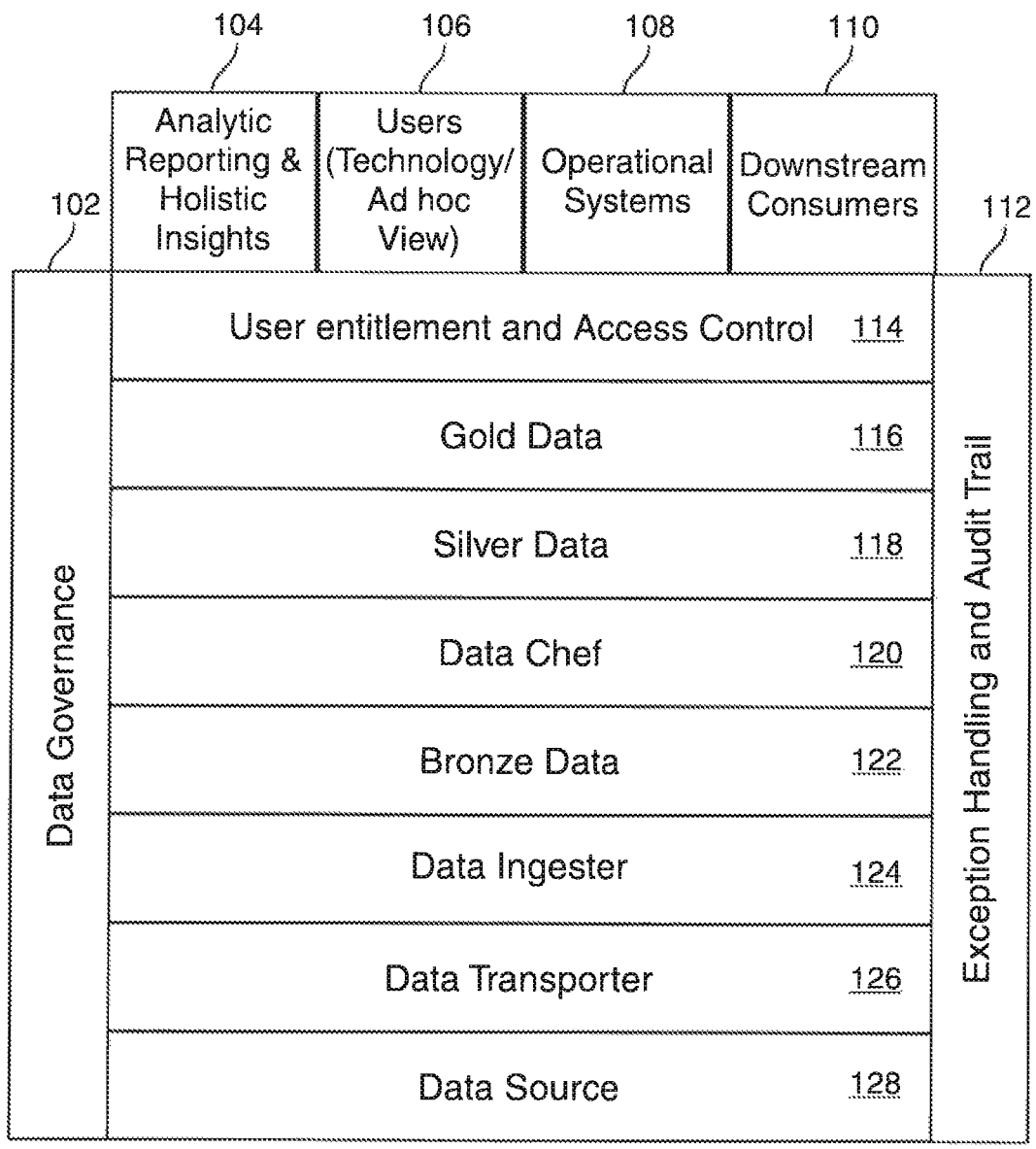
FIG. 1 shows an illustrative diagram in accordance with principles of the disclosure.

Apparatus and methods for standardizing data input, data output and data manipulation at a data lake is provided. Methods may include receiving a seed file at a data transporter. The seed file may include a list. The list may identify data elements. The list may identify a data source location for each data element.

Methods may include parsing the seed file at the data transporter. The parsing may include separating the seed file into a plurality of data elements and data source locations for each of the data elements.

Methods may include validating the seed file at the data transporter. The validating may include verifying that each data element, included in the plurality of data elements, is located in the data source location identified in the plurality of data source locations.

Methods may include retrieving the data elements from the plurality of data source locations at the data transporter.

Methods may include transferring the data elements at the data transporter. The data transporter may transfer the retrieved data elements from the data source locations to an edge node at the data lake.

Methods may include receiving a plurality of schema configuration files at data ingester. The data ingester may be located at a data lake. The plurality of schema configuration files may include a plurality of first schema configuration files. Each of the first schema configuration files may correspond to a data element transferred to the data lake.

Methods may include labeling each data element transferred to the data lake at the data ingester. The labeling may be based on the received first schema configuration file.

Methods may include converting a format of each of the data elements at the data ingester. The format of each of the data elements may be converted from a native format to a data lake accessible format.

Methods may include validating each of the data elements at the data ingester. The validation may be executed using a set of standardization validation rules.

Methods may include storing each of the labeled, converted and validated data elements at one or more locations at the data lake. The one or more locations may be based on the first schema configuration file.

Methods may include archiving the labeled, converted and validated data elements at the data lake. The data ingester may execute the archival process.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows data levels and data transformation as the data is transferred through the data levels. Data may be generated or stored at data source 128.

Data transporter 126 may transport data from data source 128 to data ingester 124. Data ingester 124 may consume the data at a data lake.

Raw data consumed by the data ingester may be referred to as bronze data 122. Data chef 120 may be located at the data lake. Data chef 120 may execute one or more business rules on the data. Data chef 120 may execute default business rules and end-user-specific business rules. Silver data 118 may be data, included in the data lake, upon which default business rules have been executed. Gold data 116 may be data, included in the data lake, upon which end-user-specific business rules have been executed.

User entitlement and access control 114 may ensure that access to bronze data 122, silver data 118 and gold data 116 is limited by user entitlements.

Analytic reporting and holistic insights 104, users (technology/ad hoc view) 106, operational systems 108 and downstream consumers 110 may indicate various downstream uses for the data included in the data lake. It should be appreciated that bronze data 122, silver data 118 and gold data 116 may be included in the data lake.

Analytic reporting and holistic insights 104 indicate that access to the data lake may support analytic reporting and holistic insights to an end user.

Users (technology/ad hoc view) 106 indicate that end users may access the data included in the data lake. The end users may access the data via a standardized technology channel, such as a programmed graphical user interface. The end users may also access the data via an ad hoc view. The ad hoc view may include non-standardized access to the data lake.

Operational systems 108 indicates that various systems may access the data included in the data lake. Downstream consumers 110 indicates that different downstream consumers may access the data included in the data lake.

It should be appreciated that access to the data included in the data lake may be limited by user entitlements and access control as indicated at 114.

Data governance 102 may maintain and regulate the availability, usability, integrity and security of data and its associated metadata. Data governance 102 may maintain and regulate the data, and its associated metadata, being transferred to and from the data lake and transformed at the data lake.

Exception handling and audit trail 112 may indicate that the process shown in FIG. 1 may incur exceptions. As such, exception handling and audit trail 112 may provide exception handling in the event that a failure occurs in the process of transferring data from data source 128 to end users and systems, shown at 104, 106, 108 and 110, via a data lake. Also, exception handling and audit trail 112 may store audit data relating to the transfer and transformation of the data.

Figure 2:
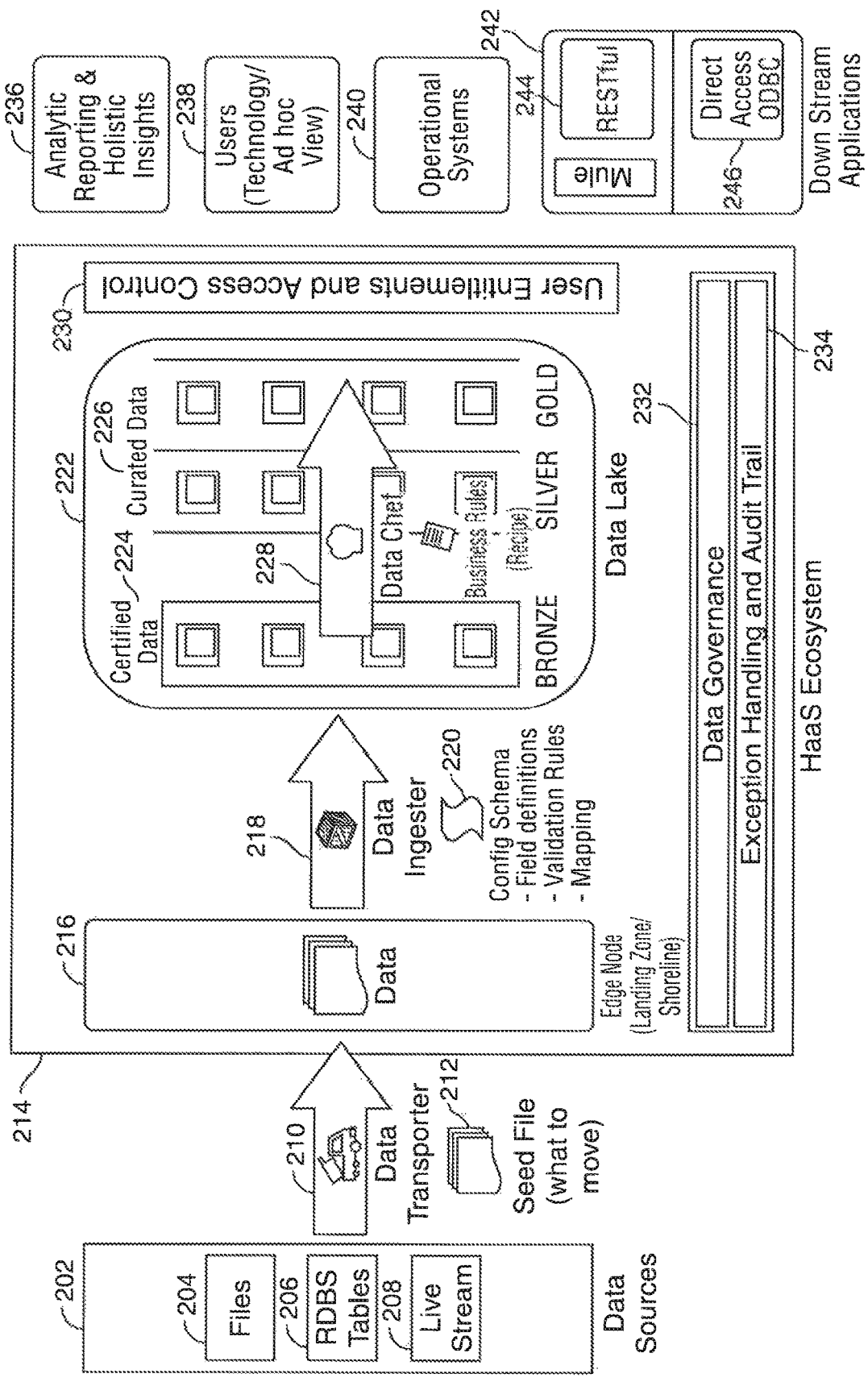
FIG. 2 shows another illustrative diagram in accordance with principles of the disclosure.

FIG. 2 shows an illustrative diagram. Data may originate at various sources. Data sources 202 may include files 204, relational database ("RDBS") tables and live streams 208.

The data may be transported from the data sources to Hadoop®-as-a-service ("HaaS") ecosystem 214. Data transporter 210 may transport the data from data sources 202 to HaaS ecosystem 214. Seed file 212 may communicate to data transporter 210 what data to move from which data source. A seed file may be an input file that includes a list of data sources. Each line of the input file may include a different data source. There may be multiple seed files. Each seed file may identify data located in a file, an RDBS table or a live stream.

Data transporter 210 may transport the data to a landing zone within HaaS ecosystem 214. Edge node 216 may be a landing zone, also referred to as a shoreline. Edge node 216 may receive data from various data sources. It should be appreciated that the data included in edge node 216 may be raw data, as received from the various data sources.

Data ingester 218 may retrieve the raw data from edge node 216. As shown at 220, data ingester 218 may configure the schema for the data. Such configuration may include field definitions, validation rules and mapping. After configuration by data ingester 218, the data may be defined as certified data 224. Certified data 224 may also be referred to as bronze data. Certified data 224 may be included in data lake 222.

Data chef 228 may process certified data 224. Pursuant thereto, data chef 228 may execute one or more business rules (recipes) on certified data 224. The processed data may be referred to as curated data 226. Curated data 226 may also be referred to as silver data or gold data. Curated data 226 may also be included within data lake 222. It should be appreciated that silver data may refer to data that has been processed using default processing, and gold data may refer to data that has been processed using end-user specific processing. As such, silver data may be transferred. However, silver data may typically not be transformed to be specific to the needs of an end user. Gold data, on the other hand, may be customized for an end user.

Data governance 232 shows a process for managing availability, usability, integrity and security of the data while the data is located within Haas ecosystem 214. Exception handling and audit trail 234 shows a process for managing exceptions and data anomalies as well as maintaining records of data movement within Haas ecosystem 214.

User entitlements and access control 230 may be included in HaaS ecosystem 214. User entitlements and access control 230 may serve as a gateway between Haas Ecosystem 214 and end users. As such, user entitlements and access control 230 may restrict access to the data included in data lake 222 based on the end user entitlements.

End users for Haas ecosystem 214 may include analytic reporting and holistic insights 236, technology users and ad hoc viewing users 238, operational systems 240 and downstream applications 242.

Downstream applications 242 may include various applications. The applications may be management console applications, such as mule. The applications may be representational state transfer (RESTful) applications, shown at 244. The applications may be direct access open database connectivity (ODBC) applications, shown at 246.

Mule may be an enterprise service bus (ESB) and integration framework that centralizes and monitors functions for enterprise service bus (ESB) deployments. Applications that follow the mule framework may access and utilize the data included in data lake 222.

RESTful applications may be applications that follow representational state transfer standard. The RESTful approach may establish that requesting information about a resource state may be similar to invoking a uniform resource locator (URL). As such, an application programming interface (API) exposed from a RESTful application may be presented in a secure, uniform and stateless manner to a calling client. Applications that follow RESTful standard may access and utilize the data included in data lake 222.

ODBC may be a specification for a database API for accessing database management systems. Applications that follow an ODBC specification may access and utilize the data included in data lake 222.

Figure 3A:
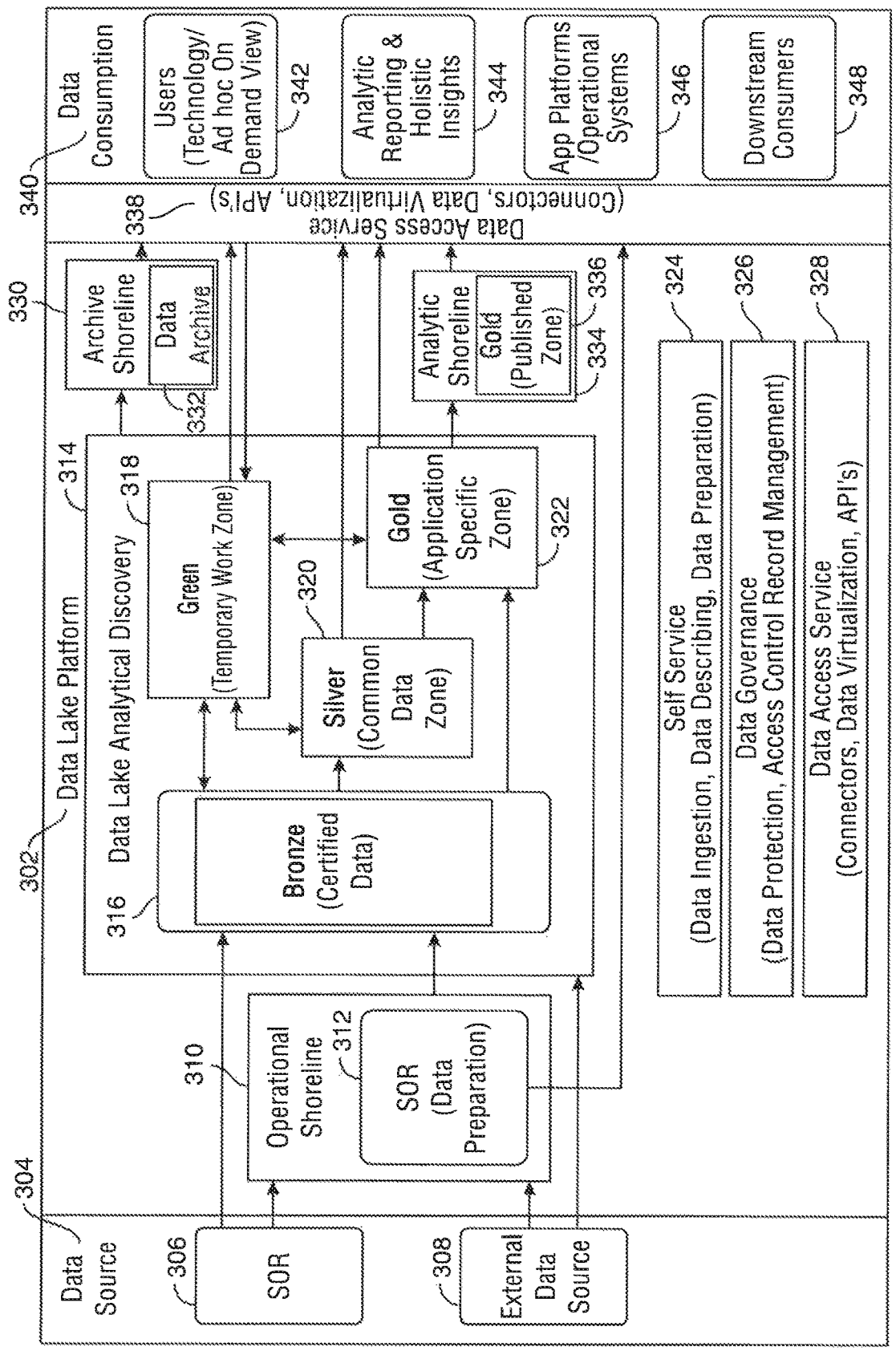

FIGS. 3A and 3B show illustrative diagrams.

FIG. 3A includes various components of a data lake architecture. FIG. 3B includes details of certain components shown in FIG. 3A.

Various sources of data may feed into data lake platform 302. Such data sources may be shown at 304. Such data sources may include one or more systems of record (SORs), as shown at 306. An SOR may be an information storage system. The information storage system may be implemented on a computer system running a database management system. Such data sources may also include external data sources, as shown at 308.

The data may be transported from the data sources to the data lake platform. At the data lake platform, the data may be entered into operational shoreline 310. Operational shoreline 310 may be an edge node or a landing zone for the data as it is being entered into the data lake platform 302. It should be appreciated that SOR data preparation module 312 may be a location for data preparation within operational shoreline 310.

Data from operational shoreline 310 may pass to bronze data zone 316. Bronze data zone 316 may be located within data lake analytical discovery 314. Data from operational shoreline 310 may also pass from SOR data preparation module 312 directly to data access service, shown at 338. Data access service 338 may include connectors, data virtualization and APIs.

Data lake platform 302 may include operational shoreline 310, which may be the front end of the data lake platform, data lake analytical discovery 314, archive shoreline 330 and analytic shoreline 334. Both archive shoreline 330 and analytic shoreline 334 may be used as the edge node for the data exiting data lake platform 302.

Data lake analytical discovery 314 may include various data zones. The data zones may include bronze data zone 316, green data zone 318, silver data zone 320 and gold data zone 322.

Bronze data zone 316 may include certified data, which will be described in more detail below in connection with element 350 in FIG. 3B. Green data zone 318 may be a temporary work zone, which will be described in more detail below in connection with element 356 in FIG. 3B. Silver data zone 320 may be a common data zone, which will be described in more detail below in connection with element 352 in FIG. 3B. Gold data zone 322 may be an application specific zone, which will be described in more detail below in connection with element 354 in FIG. 3B.

It should be further appreciated that data from system(s) of record 306 and/or external data source 308 may be entered at operational shoreline 310 or at bronze data zone 316 within data lake analytical discovery 314.

Bronze data zone 316 may interact with green data zone 318 to refine the data. Data included in bronze data zone 316 may also be transferred to silver data zone 320 and/or gold data zone 322.

Data included in green data zone 318 may be accessed via one or more data access services, shown at 338. Green data zone 318 may interact with bronze data zone 316, silver data zone 320 and gold data zone 322 in order to process and/or refine data.

Data included in silver data zone 320 may be transferred to gold data zone 322. Data included in silver data zone 320 may be accessed via one or more data access services, shown at 338. Data may be transferred from silver data zone 320 to gold data zone 322. Data included in gold data zone 322 may be accessed via one or more data access services, as shown at 338.

Data included in gold data zone 322 may interact with analytic shoreline 334. Analytic shoreline 334 may be an edge node, included in data lake platform 302. Analytic shoreline may access and/or include gold data, as shown at 336. Analytic shoreline 334 may communicate with gold data zone 322 to retrieve the data located within gold data zone 322. Analytic shoreline 334 may be accessed by one or more data access services, shown at 338. The one or more data access services may access the data within analytic shoreline 334.

Self-service 324 indicates that the various processes within the data lake platform may be self-service. For the purposes of this application, self-service may be understood to mean that such a process can be initiated and executed by a line of business without requiring the additional input of technical support to enable or maintain the process. Such processes may include data ingestion, data describing and data preparation. Data ingestion may include the process of entering data from one or more SORs or other external data sources into the data lake platform. Data describing may include the process of describing and categorizing the data while in the data lake platform. Data preparation may include preparing the data for consumption by one or more end users.

Data governance, shown at 326, indicates that data protection and access control record management are in place during the data transformation at data lake platform 302.

Data access service, shown at both 328 and 338 may include one or more connectors, one or more data virtualization platforms and one or more APIs. The connectors, platforms and APIs enable end users to access the data within data lake platform 302.

Data consumption column 340 may indicate various end users that may utilize the data included in data lake platform 302. It should be appreciated that the end users may access the data via one or more data access services, such as those shown at 328 and 338.

Data consumption column 340 indicates that technology users and ad hoc on demand view users may access the data within data lake platform 302, as shown at 342. Users and/or modules associated with analytic reporting and holistic insights may also utilize and/or access the data included in data lake platform 302, as shown at 344.

Data consumption column 340 indicates that application platforms and/or operational systems may access the data within data lake platform 302, as shown at 346. Data consumption column 340 indicates that downstream consumers may access the data within data lake platform 302, as shown at 348.

FIG. 3B shows an illustrative diagram. The illustrative diagram shows various types of data, bronze data 350, silver data 352, gold data 354 and green data 356. Data may be labeled as either bronze, silver, gold or green based on certain properties and specifications with which the data complies.

Bronze data 350 may include data received from one or more SORs. Bronze data 350 may include data that has been converted from its native format into a format that is accessible at the data lake. Bronze data 350 may also include data that has been validated during the data ingestion process. Bronze data 350 may be utilized for discovery and analytics for deriving common application specific data.

Silver data 352 may include data that has been processed using common business logic. As such, consistent analysis may be performed on all data included in silver data 352. Silver data 352 may include integrated, conformed data. Silver data 352 may be transformed and organized for common use. Silver data 352 may provide business logic for common use. Silver data 352 may be used for provisioning and analytics.

Gold data 354 may include that has been further refined and organized for application-specific use for analytics modeling and reporting. Gold data 354 may be specific to an end user, while silver data 352 may be generic refined data.

Green data 356 may include data that is being processed. Specifically, green data may be included in transient workspaces. Green data 356 may also include user-managed data or temporary workspaces. Green data 356 may be an interim location that supports analytical workflows and report/model development. Access to data included in green data 356 may be limited to specific individuals and/or workgroups. The specific individuals and/or workgroups may own the data that they are able to access. As such, various individuals and/or workgroups may be able to access a portion of the data included in green data 356. Such access may be based on their respective data ownership.

Figure 4:
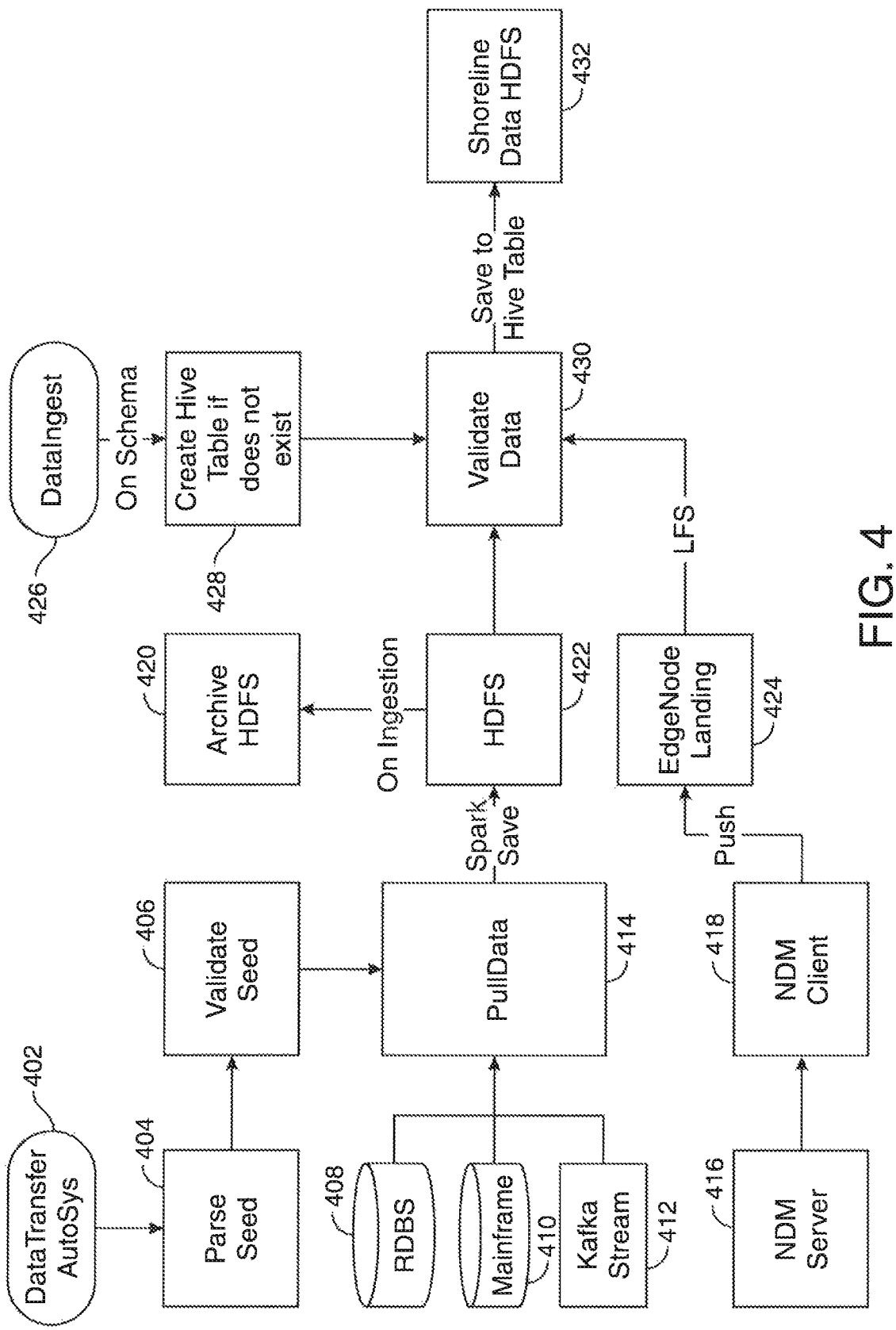
FIG. 4 shows an illustrative flow chart in accordance with principles of the disclosure.

FIG. 4 shows an illustrative flow chart. A data transfer instruction may be scheduled, as shown at 402. The data transfer instruction may be scheduled within an AutoSys® environment. An AutoSys® environment may be a job scheduling environment.

Once the data transfer instruction is initiated, a seed input file is parsed, as shown at 404. A seed input file may be an input file that includes a list of data sources. Each line of the input file may include a different data source. Once the seed file is parsed, each data source included in the seed file may be validated, as shown at 406.

Once the data sources included in the seed file are validated, the data, indicated in the seed file, may be pulled from the respective data source, as shown at 414. Various data sources may include RDBS 408, mainframe computers 410 and Kafka® stream 412. RDBS 408 may include one or more relational databases and/or database tables. Mainframe computers 410 may include one or more mainframe computers or servers. Kafka® stream 412 may include one or more data pipelines that access one or more data sources.

Once the data is retrieved from the data sources, the data may be saved via Spark® to a Hadoop® Distributed File System (HDFS), as shown at 422. Spark® may be a fast, general processing engine that is compatible with Hadoop®.

Upon ingestion of the data at the HDFS, the data may be archived as shown at 420. The archived data may be stored in order to retrieve the data in the event of a failure at another location at the HDFS.

Data received at the HDFS may be validated, as shown at 430. It should be appreciated that a data ingest process, shown at 426, may create a Hive® table to match a predetermined schema if a Hive® table for that schema does not exist, as shown at 428. A Hive® table may be a table built from a structured query language (SQL)-based tool that builds over Hadoop® to process the data.

Network Data Mover (NDM) server 416 may transfer files and/or data between mainframe computers and/or midrange computers. The files may include one or more schema files. NDM client 418 may push the files and/or data from NDM server 416 to an edge node landing within the HDFS, shown at 424. From edge node landing 424, a local file server (LFS), at the HDFS, may transfer files and/or data for validation, as shown at 430.

Upon data validation, validated data may be saved to a Hive® table located within a shoreline node. It should be appreciated that the Hive® table may be the table that was created as shown at 428. The shoreline node may be located within the HDFS, as shown at 432.

Figure 5:
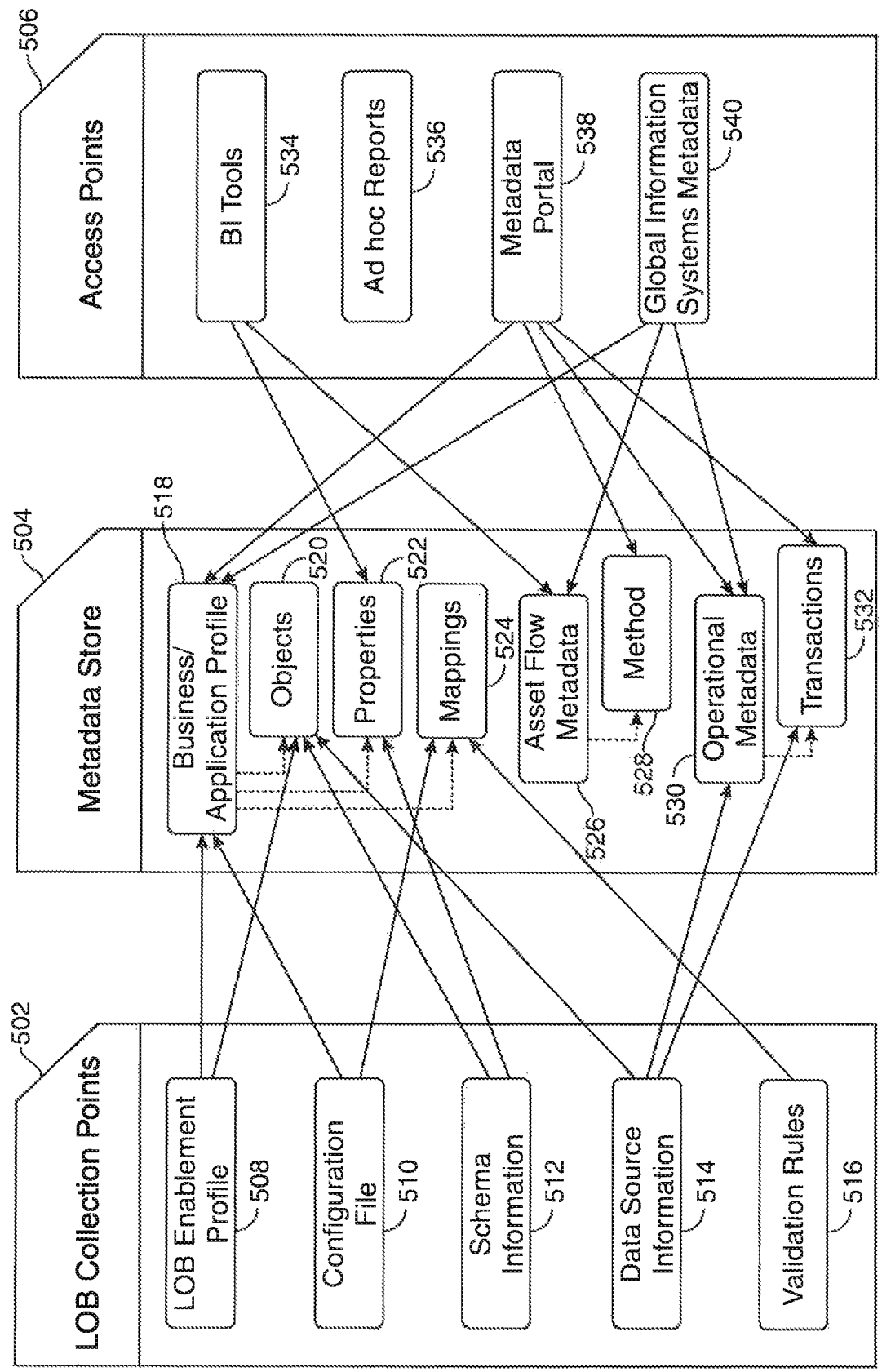
FIG. 5 shows an illustrative flow diagram in accordance with principles of the disclosure.

FIG. 5 shows an illustrative flow diagram. The illustrative flow diagram shows the communications between line of business (LOB) collection points, shown at 502, metadata store, shown at 504, and access points, shown at 506.

LOB collection points 502 may include various sources from where data and metadata can be retrieved, located or collected. LOB collection points 502 may include LOB enablement profile, shown at 508. LOB collection points may also include a configuration file(s), shown at 510. LOB collection points may also include schema information, shown at 512. LOB collection points may also include data source information, shown at 514. LOB collection points may include validation rules, shown at 516.

Metadata store 504 may include various metadata structures. LOB collection points 502 may transfer various metadata components to metadata store 504. Metadata store 504 may include business/application profile 518. Business/application profile 518 may include objects subset 520, properties subset 522 and mappings subset 524. LOB enablement profile 508 may transfer data to business/application profile 518 and objects subset 520. Configuration file 510 may transfer data to business/application profile 518 and mappings subset 524. Schema information 512 may transfer data to objects subset 520 and properties subset 522. Data source information 514 may transfer data to objects subset 520. Validation rules 516 may transfer data to mappings subset 524.

Metadata store 504 may include asset flow metadata 526. Asset flow metadata 526 may include a method subset 528.

Metadata store 504 may include operational metadata 530. Operational metadata 530 may include transactions subset 532. Data source information 514 may transfer data to operational metadata 530 and transactions subset 532.

Access points 506 may include various points available to access the metadata included in metadata store 504. Access points 506 may include business intelligence (BI) tools 534. BI tools 534 may access properties subset 522 within metadata store 504. BI tools 534 may also access asset flow metadata 526.

Access points 506 may also include ad hoc reports 536. Ad hoc reports 536 may access one or more metadata elements within metadata store 504. It should be appreciated that ad hoc reports 536 may access the one or more metadata elements as needed for the ad hoc report.

Access points 506 may also include metadata portal 538 within metadata store 504. Metadata portal 538 may access business/application profile 518 within metadata store 504. Metadata portal 538 may access method subset 528 within metadata store 504. Metadata portal 538 may access operational metadata 530 within metadata store 504. Metadata portal 538 may also access transactions metadata 532 within metadata store 504.

Access points 506 may also include global information systems metadata 540. Global information systems metadata 540 may access business/application profile 518 within metadata store 504. Global information systems metadata 540 may access asset flow metadata 526 within metadata store 504. Global information systems metadata may access operational metadata 530 within metadata store 504.

Figure 6:
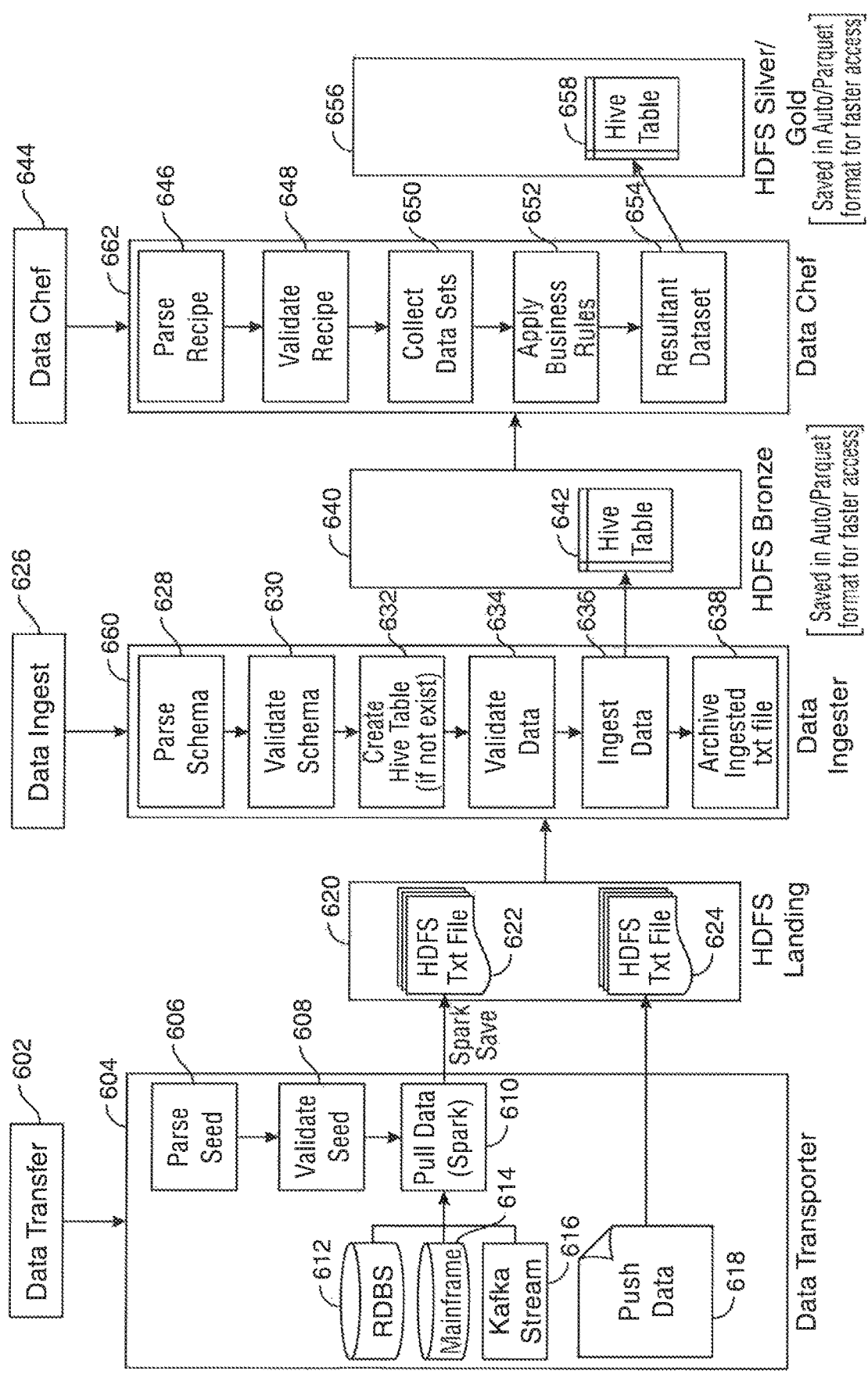
FIG. 6 shows another illustrative flow diagram in accordance with principles of the disclosure.

FIG. 6 shows an illustrative flow diagram. The illustrative diagram shows three processes: data transfer, data ingest and data chef. The diagram also shows the data communication between the data transfer process, data ingest process and data chef process.

Data transporter module 604 may execute the data transfer, as shown at 602. Data transporter module 604 may transfer the data from various data sources to HDFS landing 620. HDFS landing 620 may be an initial storage location or entry point within an HDFS.

Data transporter module 604 may include a transportation process. The transportation process may include parsing a seed file, as shown at 606. The transportation process may include validating the seed file, as shown at 608. The transportation process may include pulling data, as instructed by the validated seed file, from various data sources. The data pull may utilize Spark® technology. The data pull may retrieve data from data sources such as RDBS 612, mainframe 614 and Kafka® stream 616. The pulled data may be saved via Spark® to an HDFS text file 622 included in HDFS landing 620.

Data transporter module 604 may also include data push 618. Data push 618 may push data to HDFS text file 624 within HDFS landing 620. Data push 618 may utilize a secure shell protocol (SSH) file transfer protocol (SFTP).

Data ingester module 660 may execute a data ingest process, as shown at 626. Data ingester module 660 may include a process for ingesting data at the HDFS. Once data is ingested at the HDFS, the data may be labeled bronze data.

The data ingest process may include parsing a schema, as shown at 628. The data ingester process may include validating the schema, as shown at 630. The schema may match a predetermined data format.

The data ingest process may include creating a Hive® table if the Hive® table does not exist, as shown at 632. The Hive® table may match the schema and the predetermined data format. The data ingest process may include validating the data received from the HDFS landing, as shown at 634.

The data ingest process may also include ingesting data, as shown at 636. The ingested data may be pushed into Hive® table 642. Data included in Hive® table 642 may be labeled as bronze data, as shown at 640. The ingested files may be archived at the HDFS, as shown at 638.

Data chef module 662 may execute a data chef process, as shown at 644. Data chef process 644 may include parse recipe 646. A recipe may be a data structure for the data to be consumed by an end user without data manipulation or with minimal data manipulation. Minimal data manipulation may include less than a predetermined number of processing cycles and/or less than a predetermined amount of processing time required to be inputted by the end user to consume the data.

The data chef process 644 may parse the recipe in order to pull the appropriate data from the HDFS. The data chef process 644 may validate the recipe, as shown at 648. The data chef process 644 may collect data sets from the HDFS, as shown at 650. The data chef process 644 may apply business rules to the data sets, as shown at 652. The resultant dataset may be stored in a Hive® table, as shown at 654 and 658. The resultant Hive® table may be labeled HDFS silver or gold data, as shown at 656.

It should be appreciated that HDFS silver data may refer to data that has been manipulated by a recipe for a generic end user; and HDFS gold data may refer to data that has been manipulated by a recipe for a specific end user.

Furthermore, the HDFS bronze, silver and gold data may be saved in an auto format, which may be a parquet format. Parquet format may be a columnar format which requires less storage space than other formats. In parquet format, data records are stored in columns. For example, in a file that includes first names and last names, all first names are stored in a first row and all last names are stored in a second row. In order to retrieve a corresponding first name and last name, the system may select a column. The first name of the record may be stored in the first row of the selected column. The last name of the record may be stored in the second row of the selected column. Parquet format may provide quicker data access than other storage formats and therefore, facilitate faster access to the data. Additionally, Parquet format may be self-describing. Self-describing may mean that metadata, such as schema and structure, may be embedded within each file.

Figure 7:
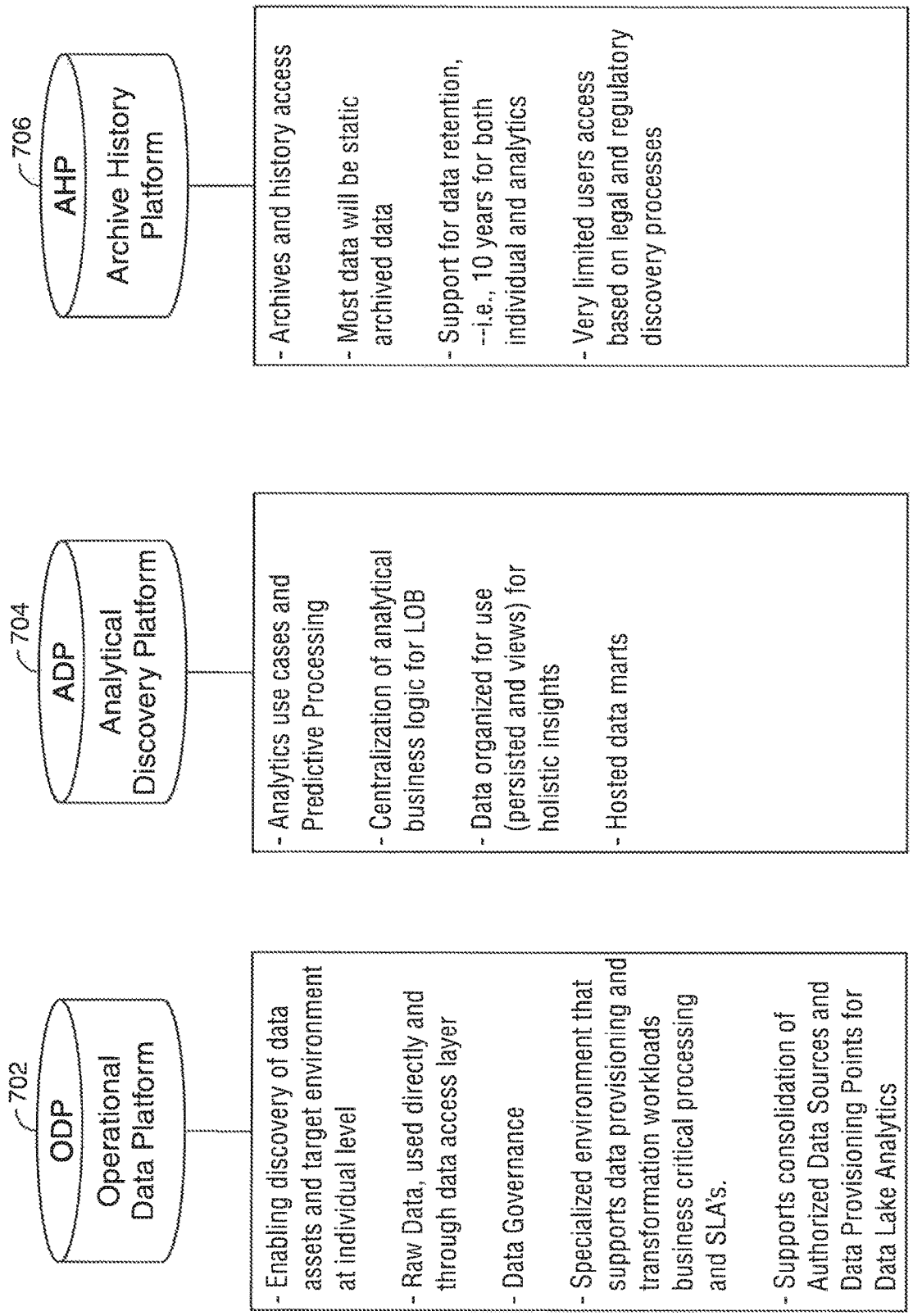
FIG. 7 shows an illustrative diagram in accordance with principles of the disclosure.

FIG. 7 shows an illustrative diagram. The illustrative diagram shows an operational data platform, shown at 702, an analytical discovery platform, shown at 704, and an archive history platform, shown at 706.

Operational data platform 702 may enable discovery of data assets and target environment at an individual level. Operational data platform 702 may include raw data. The raw data may be used directly and/or through the data access layer.

Operation data platform 702 may include data governance. Operational data platform 702 may provide a specialized environment that supports data provisioning, transformation workloads, business critical processing and service level agreements (SLAs).

Operation data platform 702 may support consolidation of authorized data sources and data provisioning points for data lake analytics.

Analytical discovery platform 704 may execute analytical use cases and predictive processing. Analytical discovery platform 704 may provide centralization of analytical business logic for one or more LOBs. Analytical discovery platform 704 may provide data organized for use for holistic insights. The data may be stored for persisted use and also enable view use. Analytical discovery platform 704 may provide hosted data marts.

Archive history platform 706 may archive data and provide historical access to archived data. Most of the archived data may be static archived data. Archive history platform 706 may support data retention. As such, data retention may be available for both individual and analytics for a predetermined time period. The predetermined time period may be ten years. Access to archive history platform 706 may be limited to users with specific entitlements. The access entitlements may be based on legal and regulatory discovery processes.

FIG. 8 shows an illustrative computer code segment. The title of the computer code segment may be Mtcjob1.seed, as shown at 802. The body of the computer code segment may be shown at 804. The seed file may indicate various sources from which to pull data.

FIG. 9 shows an illustrative computer code segment. The title of the computer code segment may be Mtcpackage.schema, as shown at 902. The body of the computer code segment may be shown at 904. The schema may include a representation of the structure of data to be retrieved. The schema may also include a format representation of the structure of data to be manipulated.

FIGS. 10A, 10B, 10C, 10D and 10E show an illustrative computer code segment. It should be appreciated that FIGS. 10B, 10C, 10D and 10E are a continuation of FIG. 10A. The title of the computer code segment is Mrctrade.schema, as shown at 1002. The body of the computer code segment is shown at 1004, 1006, 1008, 1010 and 1012. The schema may include a representation of the structure of data to be retrieved. The schema may also include a format representation of the structure of data to be manipulated.

FIG. 11 shows an illustrative computer code segment. The title of the illustrative computer code segment is MtcTradeReconDashboardRecipe, as shown at 1102. The body the computer code segment is shown at 1104. A recipe may be a structure to format data so that an end user can retrieve the data in a format suitable for the end user.

Thus, streamlined data engineering is provided. Persons skilled in the art will appreciate that the present invention can be practiced by other than the described embodiments, which are presented for purposes of illustration rather than of limitation. The present invention is limited only by the claims that follow.

What is claimed is:

1. A system for standardizing data input, data output and data manipulation at a data lake, the system comprising:
    a data transporter, executing on a processor coupled to a memory, said data transporter operable to:
        receive a seed file, said seed file comprising a list of data elements and a data source location for each data element included in the list of data elements;
        parse the seed file into a plurality of data elements and associated data source locations;
        validate the seed file by validating that each data element, included in the plurality of data elements, is located in the data source location included in the plurality of data elements and associated data source locations;
        retrieve the data elements from the plurality of data source locations; and
        transfer the retrieved data elements from the data source locations to an edge node at a data lake;
    a data ingester, operating on the processor coupled to the memory, said data ingester operable to:
        receive a first schema configuration file for each of the data elements, said first schema configuration file comprising field definitions, validation rules and mappings;
        label each of the data elements, located at the edge node at the data lake, based on the received first schema configuration file;
        convert a format of each of the data elements, located at the edge node at the data lake, from a native format to a data lake accessible format;
        execute a set of standardized validation rules on each of the data elements located at the edge node at the data lake;
        store each of the labeled, converted and validated data elements at one or more locations the data lake based on the first schema configuration file; and
        archive each of the labeled, converted and validated data elements at the data lake; and
    a data chef, operating on the processor coupled to the memory, said data chef operable to:
        execute a second schema configuration file on each of the stored data elements, said second schema configuration file operable to transform each of the data elements into integrated, conformed data elements, said second schema configuration file being received from a location other than the data source location, wherein the data elements on which were executed the second schema configuration file qualifies for a first level of curated data; and
        execute one or more recipes on each of the stored data elements, the one or more recipes manipulating each of the data elements into consumable data elements that are specifically consumable by one or more end users, the one or more recipes being received from one or more end users, wherein the data elements on which were executed the one or more recipes qualifies for a second level of curated data.

2. The system of claim 1, wherein each data element and the data source location included in the list of data elements is included on a separate line of the seed file.

3. The system of claim 1, wherein the second schema configuration file is received at the data lake from the one or more end users.

4. The system of claim 1, wherein the data chef operates on a copy of the labeled, converted and validated data elements.

5. The system of claim 4, wherein the data chef executes a plurality of recipes, each of the plurality of recipes is executed on a copy of the labeled, converted and validated data elements, each of the plurality of recipes is specific to an end user.

6. The system of claim 1, wherein the execution of the second schema configuration file and the execution of the one or more recipes comprises generating a data format map, said data format map instructing the locations of the labeled, converted and validated data elements stored in the data lake, and manipulations to accommodate end user specifications.

7. The system of claim 6, wherein the system further comprises a data output module, and when an end user, from the one or more end users, transmits a data request to the system, the data output module retrieves the requested data elements, formats the requested data elements based on the data format map and delivers the requested, formatted data elements to the end user.

* * * * *